United States Patent [19]
Knop et al.

[11] Patent Number: 5,538,576
[45] Date of Patent: Jul. 23, 1996

[54] LACQUERED OR PAINTED CARRIER AND METHOD OF USING THE CARRIER IN THE MANUFACTURE OF AN ARTICLE

[75] Inventors: Helmut Knop, Aglasterhausen; Dieter Palige, Goldbach; Wolfgang Zielinski, Rodgau, all of Germany

[73] Assignee: YMOS Aktiengesellschaft Industrieprodukte Assignee of said Palige and said Zielinski, Obertshausen, Germany

[21] Appl. No.: 259,484

[22] Filed: Jun. 14, 1994

[30] Foreign Application Priority Data

Jun. 14, 1993 [DE] Germany .................... 43 19 519.9

[51] Int. Cl.⁶ .................................................. B32B 31/12
[52] U.S. Cl. ........................ 156/229; 428/31; 156/230; 156/278
[58] Field of Search ........................ 156/235, 247, 156/249, 212, 289, 278, 230, 229; 428/31

[56] References Cited

U.S. PATENT DOCUMENTS

| | | | |
|---|---|---|---|
| 2,955,972 | 10/1960 | Wintermute et al. ............. | 156/79 |
| 3,472,546 | 10/1969 | Samuels .......................... | 428/31 X |
| 3,493,257 | 2/1970 | Fitzgerald et al. ............... | 428/31 X |
| 3,881,042 | 4/1975 | Ungerer .......................... | 428/31 X |
| 4,242,378 | 12/1980 | Arai ................................ | 427/271 |
| 4,331,704 | 5/1982 | Watson, Jr. et al. . | |
| 4,400,479 | 8/1983 | Bos . | |
| 4,694,051 | 9/1987 | Kordomenos et al. . | |
| 4,818,589 | 4/1989 | Johnson et al. ................. | 156/238 X |
| 4,853,263 | 8/1989 | Nagata et al. .................... | 428/31 |
| 4,913,760 | 4/1990 | Benson et al. ................... | 156/246 X |
| 4,976,896 | 12/1990 | Short et al. . | |
| 4,980,108 | 12/1990 | Suzuki et al. . | |
| 5,000,809 | 3/1991 | Adesko et al. ................... | 156/230 |
| 5,034,077 | 7/1991 | Pata ................................. | 156/212 X |
| 5,037,677 | 8/1991 | Halpern et al. . | |
| 5,098,956 | 3/1992 | Blasko et al. . | |
| 5,114,514 | 5/1992 | Landis ............................. | 156/212 X |
| 5,215,811 | 6/1993 | Reafler et al. . | |

FOREIGN PATENT DOCUMENTS

| | | | |
|---|---|---|---|
| 145543 | 8/1983 | Japan ............................... | 428/31 |
| 60-83839 | 5/1985 | Japan ............................... | 156/229 |
| 1-157844 | 6/1989 | Japan ............................... | 156/229 |
| 2067473 | 7/1981 | United Kingdom ............. | 428/31 |
| 2188564 | 10/1987 | United Kingdom ............. | 156/249 |

*Primary Examiner*—David A. Simmons
*Assistant Examiner*—Steven J. Helmer
*Attorney, Agent, or Firm*—W. G. Fasse; W. F. Fasse

[57] ABSTRACT

A surface or a surface portion of an article of manufacture is covered with paint or lacquer by applying a prefabricated lacquer or paint carrier to the surface or surface portion. The paint or lacquer carrier has a substrate, for example, in the form of a flexible polyester film which is preferably provided with an adhesion enhancer on one surface prior to the application of the lacquer or paint to the one surface. The so prepared carrier is then arranged on and bonded to the surface or surface portion, for example, by an adhesive bonding. Various articles of manufacture can be painted or lacquered in the manner including entire vehicle body parts.

29 Claims, 5 Drawing Sheets

LACQUERED OR PAINTED CARRIER AND METHOD OF USING THE CARRIER IN THE MANUFACTURE OF AN ARTICLE

FIELD OF THE INVENTION

The invention relates to a lacquered or painted carrier that can be secured to a surface to be painted or lacquered. The invention also relates to a method of using such a carrier in the manufacture of an article made, for example of synthetic materials or containing synthetic materials. These articles of manufacture are, for example, used in the form of decorative moldings or decor stripes in the automotive, building construction and household appliance industries.

BACKGROUND INFORMATION

It is known to provide articles of manufacture, especially made of synthetic materials or containing synthetic materials with paint or lacquer coatings which may exhibit a single color or which may be multicolored. A conventional form of application is by way of spray painting or lacquering. Where a multicolor coating is desired, masking is required to cover areas that are not to be spray painted or that are to be spray painted with a different color in a separate spraying operation. Such paint applications or lacquer applications are involved especially when masking is needed and hence expensive, especially in connection with the production of motor vehicle parts, particularly body and interior parts.

In this disclosure the terms "paint" and "lacquer" and related terms, e.g. "painted" or "lacquered" are used interchangeably herein.

OBJECTS OF THE INVENTION

In view of the above it is the aim of the invention to achieve the following objects singly or in combination:

- to provide a method for producing a lacquered or painted carrier that can be applied to an article of manufacture either with a single color or with a multicolored surface, in a more efficient way than was possible heretofore in order to reduce manufacturing efforts and costs;
- to form these colored surfaces, not by a direct lacquer or paint application, but rather by an indirect application with the aid of said carrier in the form of a colored film or foil carrying a lacquer or paint coating;
- to use the film or foil as a carrier for the lacquer or paint coating; and
- to provide a method that is equally useful for a multitude of applications in the production of articles of manufacture, e.g. rolling mill produced sections, extrusion produced sections, stretch molding sections, and components produced by die stamping in various fields, e.g. the automotive, building construction, and appliance industries.

SUMMARY OF THE INVENTION

A colored carrier according to the invention is characterized by a carrier film or foil, for example, of polyester or aluminum, by an adhesion enhancer on one surface of the film or foil and a lacquer or paint layer on the adhesion enhancer. The lacquer or paint layer may either be clear or colored. This basic film or foil carrier structure is preferably modified according to the invention by a cover layer and an adhesive layer, whereby the lacquer and/or paint layer may comprise at least one, preferably several plies, including a clear or transparent ply.

In manufacturing the present paint or lacquer carrier, a film or foil is first prepared to form a substrate and then the substrate is provided with a lacquer or paint coating on the prepared surface, whereupon the so prepared carrier is applied to the article of manufacture, such as a decorative molding, impact protection moldings, vehicle bodies or body parts, bumpers, household appliances, building construction components, and the like articles of manufacture, whereby an entire surface of an article or parts thereof may be covered by the present substrate forming a paint or lacquer carrier.

According to the invention the article such as a vehicle door is no longer directly coated by a lacquer and/or paint. Rather, the coating is prepared separately on a substrate forming a coating carrier in the form of a film or foil which is then applied to the article to be coated so that the paint or lacquer is applied indirectly since the lacquer or paint is first applied to the substrate film which in turn is then applied to the article or component to be coated. The carrier film or foil with its coating may be applied to the article either directly or through an intermediate article such as a molding that is then secured to the main article which itself may first be covered as taught by the invention.

The invention is particularly useful in connection with multicolored articles of manufacture since it avoids the use of masking by applying decorative stripes of other colors to the article of manufacture which itself is provided with a base color or base lacquer, for example decorative moldings produced according to the invention may be applied to articles also covered or coated according to the invention. The decorative article with a distinctly different color is suitably also provided with at least one carrier film or foil forming a substrate for the lacquer or paint layer or ply.

The production of a decorative strip with the lacquer or paint carrier according to the invention is simple and its application to the article to be coated or decorated is also simple as it does not require any masking. This simple application of the carriers according to the invention to an article of manufacture holds especially true if the film is heat resistant at least for a short time duration until curing at temperatures up to 210° C., for retaining its color-fastness. The color-fastness should also be retained under relatively high application pressures. The manufacture of vehicle components, particularly vehicle body components and interior components is made substantially more economical by the application of the present invention, especially where multicolored components are to be produced as compared to corresponding conventionally applied multicolors. Another advantage of the invention is seen that the prepared carriers are weather resistant and that special metallic and/or color effects may be achieved.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
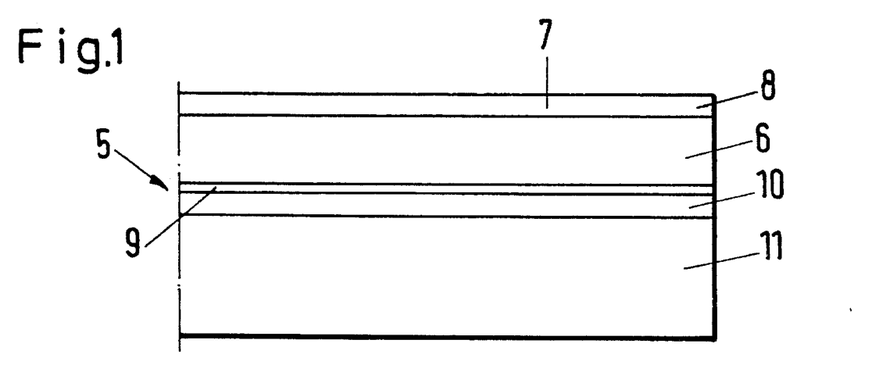
FIG. 1 shows on an enlarged scale a side view through a prepared substrate suitable to form a carrier for a lacquer or paint coating according to the invention.
Figure 2:
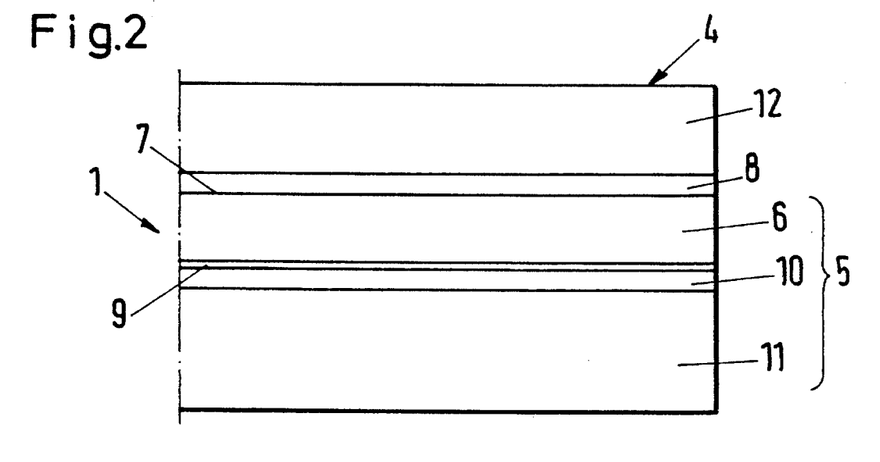
FIG. 2 shows the substrate of FIG. 1 provided with one lacquer or paint layer or ply to form the finished lacquer or paint carrier.
Figure 3:
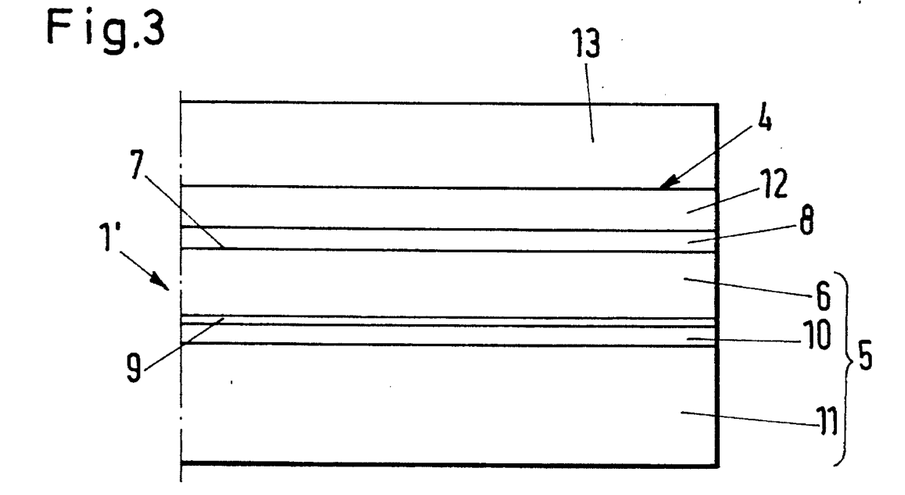
FIG. 3 is a view similar to that of FIG. 2, but showing a second lacquer or paint ply on top of the first lacquer or paint ply, whereby one of these plies may be a metallic lacquer and/or paint and the other ply may be a clear lacquer or varnish.

Referring to FIGS. 1, 2, and 3, performing the present method begins with the preparation of a substrate 5 forming a carrier for a lacquer or paint 4 shown in FIGS. 2 and 3. The substrate 5 comprises at least a carrier film or foil 6 and an adhesion enhancer 8 on a prepared surface 7 of the carrier film 6. Preferably the substrate also includes an adhesive layer 10 on an activated surface 9 of the carrier film 6. Preferably, the adhesive layer 10 is at least temporarily covered with a protective cover layer 11. FIG. 2 shows a preferred construction of the carrier that includes at least one paint or lacquer layer or ply 12 containing the paint or lacquer 4.

The carrier film 6 is preferably made of polyester which is suitably first stretched biaxially in the longitudinal and crosswise direction to obtain the desired film thickness within the range of 20 to 50 μm, preferably about 25 μm. The carrier foil is preferably an aluminum foil or a polyester film coated with a vapor deposited aluminum coating.

One surface 7 of the carrier film or foil 6 is provided with an adhesion enhancer 8 which itself is not necessarily an adhesive, but it promotes the adhesion of the lacquer or paint 4 shown FIG. 2 as layer or ply 12 on the surface of the carrier film 6. The adhesion enhancer 8 is preferably an acrylic polymer on an acrylate basis having a layer thickness within the range of 0.2 to 0.5, preferably 0.3 μm. The opposite surface 9 of the carrier film or foil 6 is activated for an improved bonding between the surface of the film 6 and an adhesive layer 10. The activation is, for example, performed by a corona discharge treatment that provides an improved bonding between the polyester film 6 and the adhesive 10 which is preferably a pressure activated adhesive, bonding agent or cement. After application of the adhesive 10 a protective cover layer 11 is secured to the outwardly facing surface of the adhesive 10. The adhesive facing surface of the cover layer 11 is preferably siliconized to facilitate peeling off the cover layer 11 prior to applying the present decorative films to an entire surface or surface portion of an article of manufacture. The cover layer with its siliconized surface is, for example, made of paper having a thickness within the range of 50 to 300 μm, preferably 170 μm.

The adhesive 10 is preferably a temperature curing acrylic polymer or acrylate base pressure activated adhesive or cement having a layer thickness within the range of 5 to 15, preferably 10 μm.

Referring to FIG. 2, the present carrier 1 according to the invention includes the substrate 5 shown in FIG. 1 with the adhesion enhancer layer 8 and the lacquer or paint 4 forming the layer 12. The lacquer or paint 4 of the layer 12 is preferably selected from modified two-component polyurethane lacquers which may have a single color or the layer 12 may comprise two plies of which one ply is a pigmented metallic base lacquer or paint and the outer ply may be a clear lacquer or varnish 13 as shown in FIG. 3 showing a carrier 1'. By using several plies to build up the lacquer or paint 4, a metallic effect or a mineral color effect, or the like may be achieved. As shown in FIG. 3 the paint or lacquer ply 13 covers the ply 12. Preferably the ply 13 is a transparent or clear lacquer which is preferably a two-component lacquer or a varnish.

When the lacquer or paint 4 of the layer 12 is a single color lacquer or so-called uni-lacquer, it is preferably or suitably selected from the group of interlinked isocyanates forming a polyacrylate containing hydroxyl groups.

In order to impart to the lacquer or paint 4 the required elasticity it is necessary to modify the lacquer by an elasticity enhancer such as an elastifying resin that is stable against migrations. Further, the binder vehicle must be very capable of reacting, in other words, must have a high reactivity which is achieved by the addition of a catalyst. However, attention must be paid to the required curing time of the lacquer to be produced and the formation of defects in the lacquer surface, for example, during the intended drying, must be avoided so that the formation of bubbles or the like is prevented.

In order to avoid damage of the surface of the paint or lacquer 4 on the film 6 when the latter is rolled up, it is recommended that a specific anti-blocking agent is added to the lacquer. The anti-blocking agent is preferably a modified polysiloxane.

Figure 4:
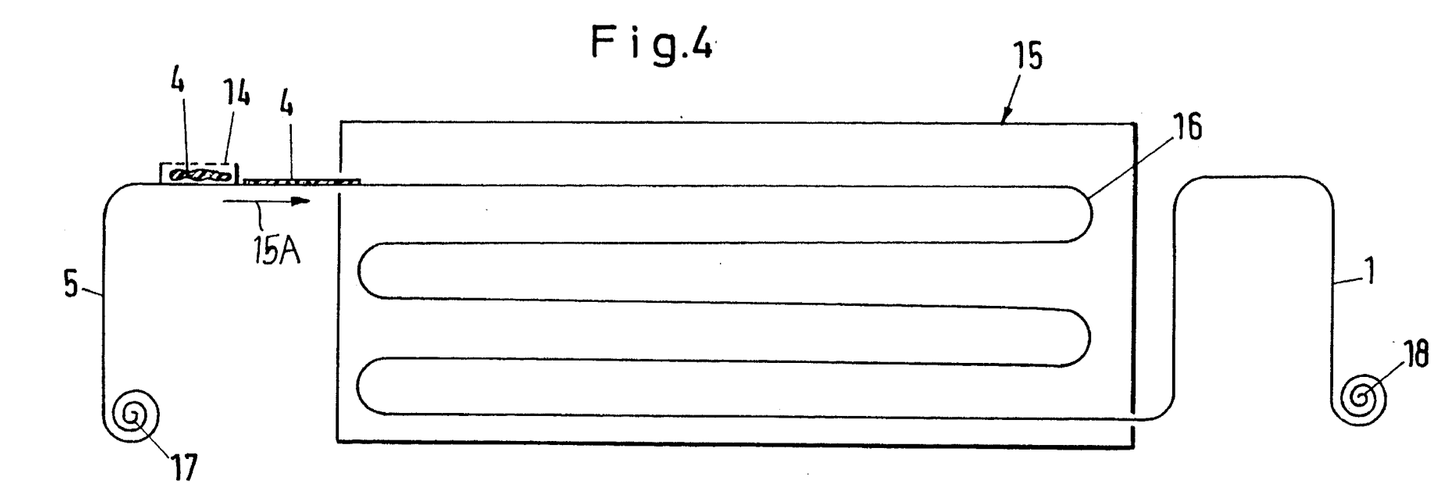
FIG. 4 shows schematically an apparatus for the production of lacquer and/or paint carriers according to the invention including an application station, a drying station, and a roll-up station.
Figure 5:
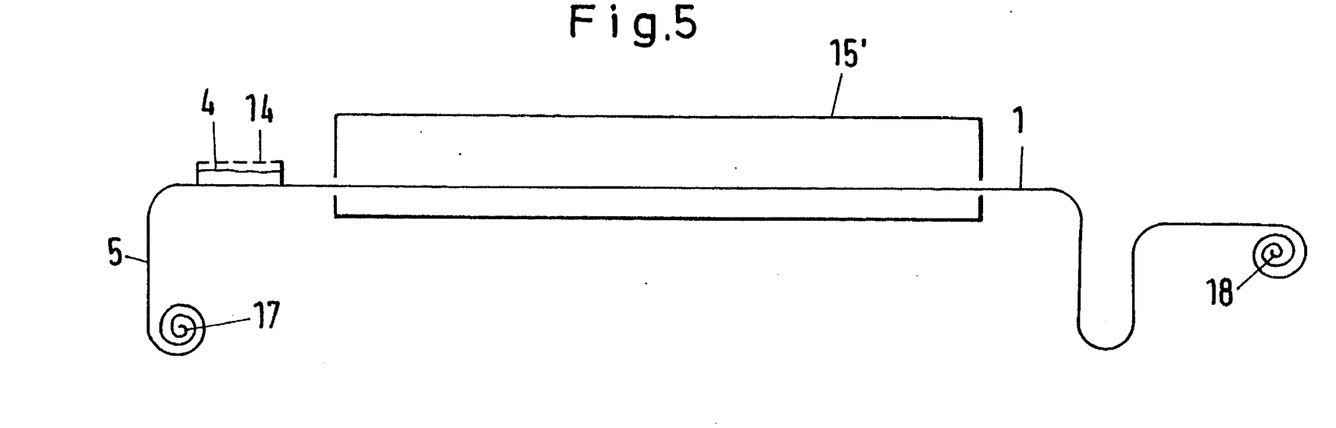
FIG. 5 is a view similar to that of FIG. 4, but showing a modified apparatus for the production of a lacquer and/or paint carrier according to the invention.

Referring to FIGS. 4 and 5, the lacquer or paint 4 prepared as described above is applied to the substrate 5 also prepared as above in a doctor blade type of spreader 14 to form a coating on the substrate 5 which is then passed into a drying station 15 in the direction of the arrow 15A. The substrate 5 is preferably pulled off a supply roller 17 and the ready carrier 1 or 1' is rolled up on a take-up roller 18. Guide rollers not shown may be used as required, for example to pass several loops 16 of the coated substrate through the dryer 15. Instead of using a doctor blade type of spreader 14, a spraying cabin equipped with spraying nozzles may be used. In any event the dried layer thickness of the layer 12 comprising the lacquer or paint 4 will be within the range of 30 to 90 μm, preferably 50 μm.

If the lacquer 4 is a two-ply metallic lacquer with plies 12 and 13, it will comprise a binder vehicle mixture with metallic and/or effect pigments in a base lacquer and the mixture is physically dry. The binder vehicle in this case is selected on the basis of a polyester cellulose aceto butyrate. The bonding between the substrate, specifically the film 6 and the lacquer 4 is improved by adding a low melting or soft resin.

Depending on the required drying, the dryer 15 may be replaced by a dryer 15' without any detour guide rollers as shown in FIG. 5. In any event, the air temperature inside the heater 15 or 15' will be within the range of about 60° to about 80° C. The air throughput through the dryer 15, 15' will be adjusted as required, based on the type of lacquer or paint. Mere routine experiments are involved in ascertaining the required air throughput and drying temperatures.

After the drying and if a clear lacquer or varnish 13 as shown in FIG. 3 is to be applied, the application of the clear lacquer 13 can take place in the same manner as described above to form a carrier 1' that comprises the substrate 5 including several layers and the two lacquer layers 12 and 13 as shown in FIG. 3. In case the two-ply lacquer layer is used as shown in FIG. 3, the dried layer thickness of the base lacquer layer 12 is suitably within the range of 15 to 50 μm, preferably approximately 15 μm and the layer thickness for the clear lacquer 13 is suitably within the range of 25 to 100 μm, preferably approximately 30 μm.

A lacquer composition suitable for application by a doctor blade type spreader or by a spraying gun and that may be used for a single color lacquer 4 and/or for a clear lacquer 13 is as follows.

| | |
|---|---|
| An acrylic base lacquer containing hydroxy groups (conventionally pigmented or clear lacquer) | 60.7% by weight |
| Aliphatic polyisocyanate curing agent | 29.6% by weight |
| Modified polyester as an elastifier | 4.5% by weight |
| Organo-tin catalyst (for reaction for example with dibutyl-tin dilaurate or the like) | 4.7% by weight |
| Polysiloxane as an anti-blocking agent | 0.5% by weight |
| for example polysiloxane polyether polymer | |
| | 100% by weight |

The components in the above example can be replaced by equivalent components, whereby the respective weight percentage rates may change accordingly.

The carrier 1 or 1' produced as described above can be used in various ways. For example, the carrier according to the invention may be deep-drawn in a mold for bonding to a foam backing, for example, by spraying or foaming a foam material in the mold. Further, it is possible to use the carriers 1 or 1' according to the invention for application to many different types of articles of manufacture, such as impact protection moldings or bumpers or the like. Decorative moldings themselves may be decorated with the present carriers. An especially practical application of the present films is possible on rolling mill produced sections, on extrusion produced sections, on stretch molding sections and/or on stamped or die cut parts.

It is further possible to apply the present carriers 1, 1' on entire body components such as car doors which can be accomplished with substantial cost savings, as will be described below with reference to FIGS. 6 to 10.

Figure 6:
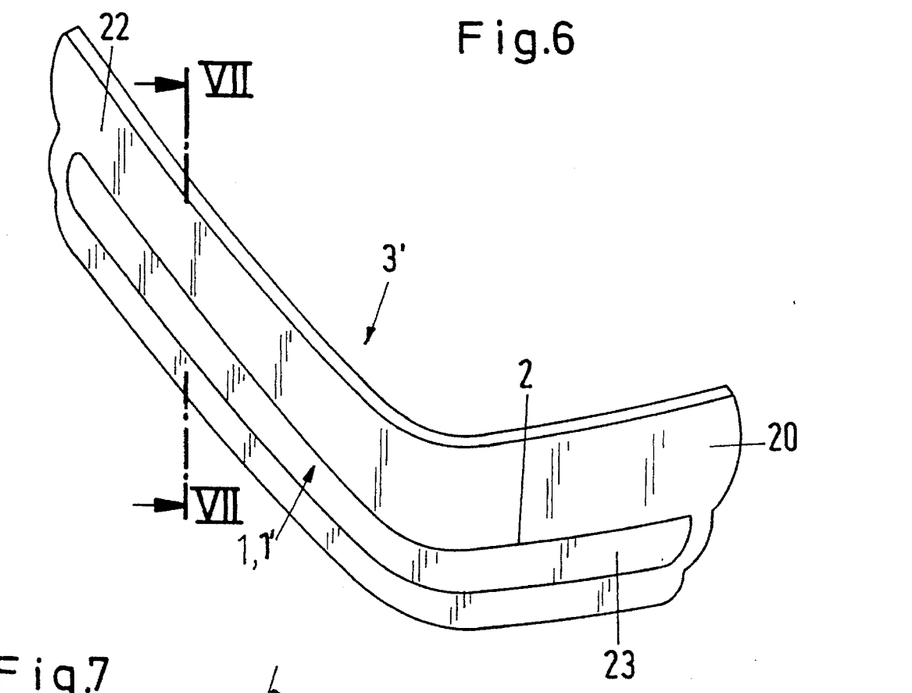
FIG. 6 shows a perspective view of a portion of a rear vehicle bumper provided with a decorative molding according to the invention having a color different from the color of the bumper.
Figure 7:
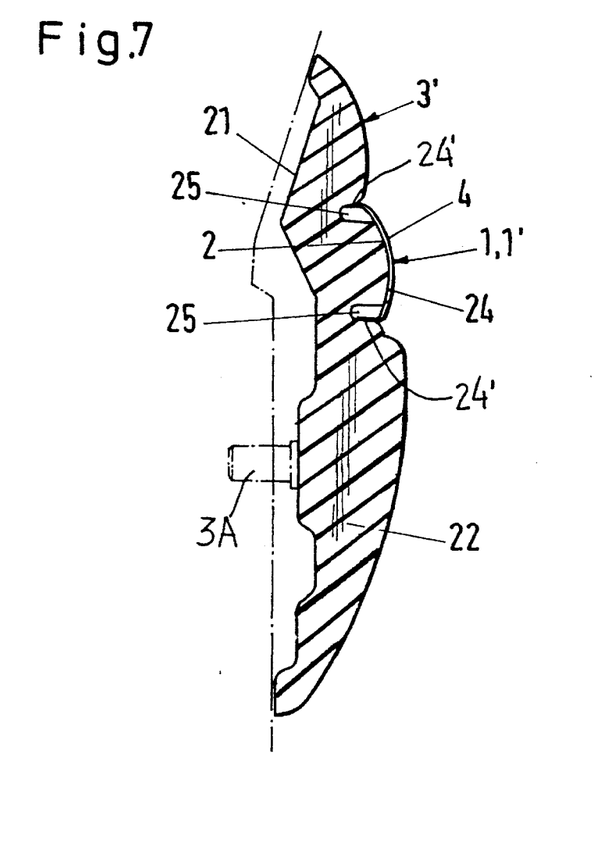
FIG. 7 is a sectional view along section VII—VII in FIG. 6, but with the bumper turned upside down.

FIGS. 6 and 7 show a left side impact protection molding 3' having a longitudinal section 22 and a bent end section 20 that reaches into the or around the rear end of the vehicle. The impact molding 3' comprises a support body 21 made of impact resistant synthetic material such as fiber reinforced composites and a decor strip 23 covered with a carrier 1 or 1' according to the invention. In the embodiments of FIGS. 6 and 7 the carrier 1 or 1' is not directly applied to the side molding 3'. Rather, the carrier 1, 1' with its substrate is secured to an intermediate article of manufacture forming an intermediate carrier 24 having a curved portion and two leg portions extending into grooves 25 in the body of the impact molding 3'. The carrier 24 is a narrow elongated element such as a metal band or strip to which the paint or lacquer carrier 1, 1' is first secured, for example, by the above mentioned adhesive 10. Thereafter, the carrier 24 is secured to the impact molding 3', for example, in that the legs 24' snap with a bias force into the grooves 25 formed in the body 21 of the impact molding 3'. A fastener 3A, such as a snap-on fastener, serves for securing the side impact molding 3' to the body of a vehicle not shown. However, the decor intermediate carrier 24 with its lacquer or paint carrier 1, 1' may also be glued into the grooves 25 in the body 21 of the molding 3'. Conventional snap-in fasteners may also be used for this purpose. All these methods of securing the carrier 24 with its lacquer layer 4 provide a safe and reliable attachment to the body 21.

After removal of the protective cover 11, the carrier 1 or 1' is secured to the intermediate carrier 24 by the above mentioned adhesive 10 which may be preferably a self-sticking pressure and/or temperature responsive adhesive. As seen in FIG. 7, the lacquer 4 forms the outer surface of the decor strip that covers the surface portion 2 of the impact molding 3' between the grooves 25.

Figure 8:
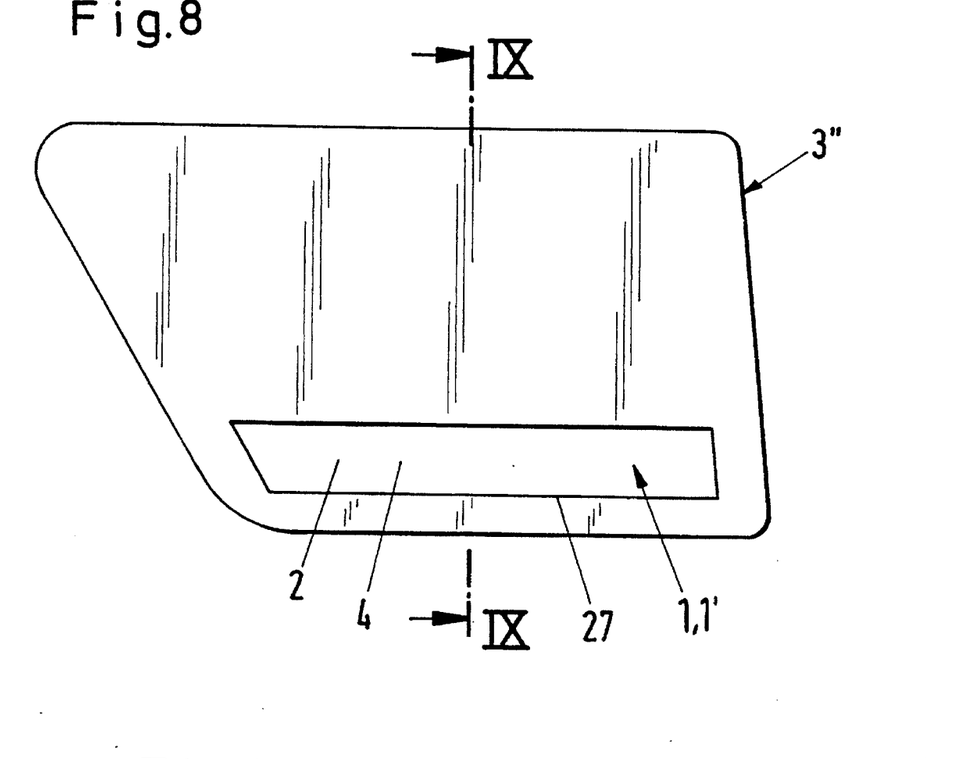
FIG. 8 illustrates a portion of a two-colored decorative molding for a vehicle fender.
Figure 9:
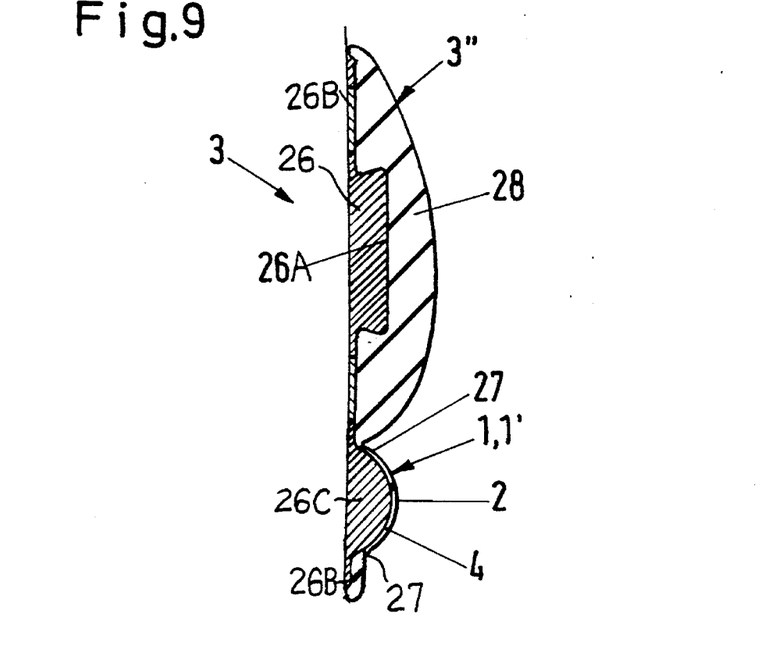
FIG. 9 illustrates a sectional view along section line IX—IX in FIG. 8.

FIGS. 8 and 9 illustrate a modified embodiment of the invention. A portion 3" of a fender provided with a surface area 2 forming a window covered by a carrier 1 or 1' in such a way that again the lacquer 4 forms the outer surface in a fender body portion 28 provided with a metal backing 26 connected to the body 28, for example by tongue and groove dovetailing 26A and by anchors 26B. The body 28 of the fender 3" has a cutout 27 forming a window through which a bulge 26C of the metal backing extends. The carrier 1 or 1' is directly secured to the bulge 26C that reaches through the cutout 27, whereby the surface facing the bulge 26C of the metal backing 26 is provided with the above mentioned adhesive 10 as described with reference to FIGS. 1 to 3.

Referring further to FIGS. 8 and 9, the fender portion 3" is produced as follows. First, the metal backing 26 is formed, for example, by roller molding. Then the lacquer or paint carrier 1 or 1' is applied to the bulge 26C of the metal backing 26. Preferably, the application of the carrier 1 or 1' takes place simultaneously with the roller molding of the backing 26 at a small pressure and at a slightly elevated temperature within the range of 50° to 60° C. or at room temperature, whereby the carrier 1, 1' is directly secured to the backing 26 before it is combined with the synthetic material body 28. The body 28 is produced separately as an extrusion body into which the cutout 27 is stamped or the body 28 is formed in a mold that forms the cutout 27 together with the body 28. Then, the backing 26 and the body 28 are connected, whereby adhesive anchoring at 26B may be used in addition to a snap-on connection of the tongue and groove 26A. The connection may be preferably performed at a temperature up to about 200° C. to 210° C. and with a pressure of up to 10 bar with a dwell time up to 30 seconds.

Figure 10:
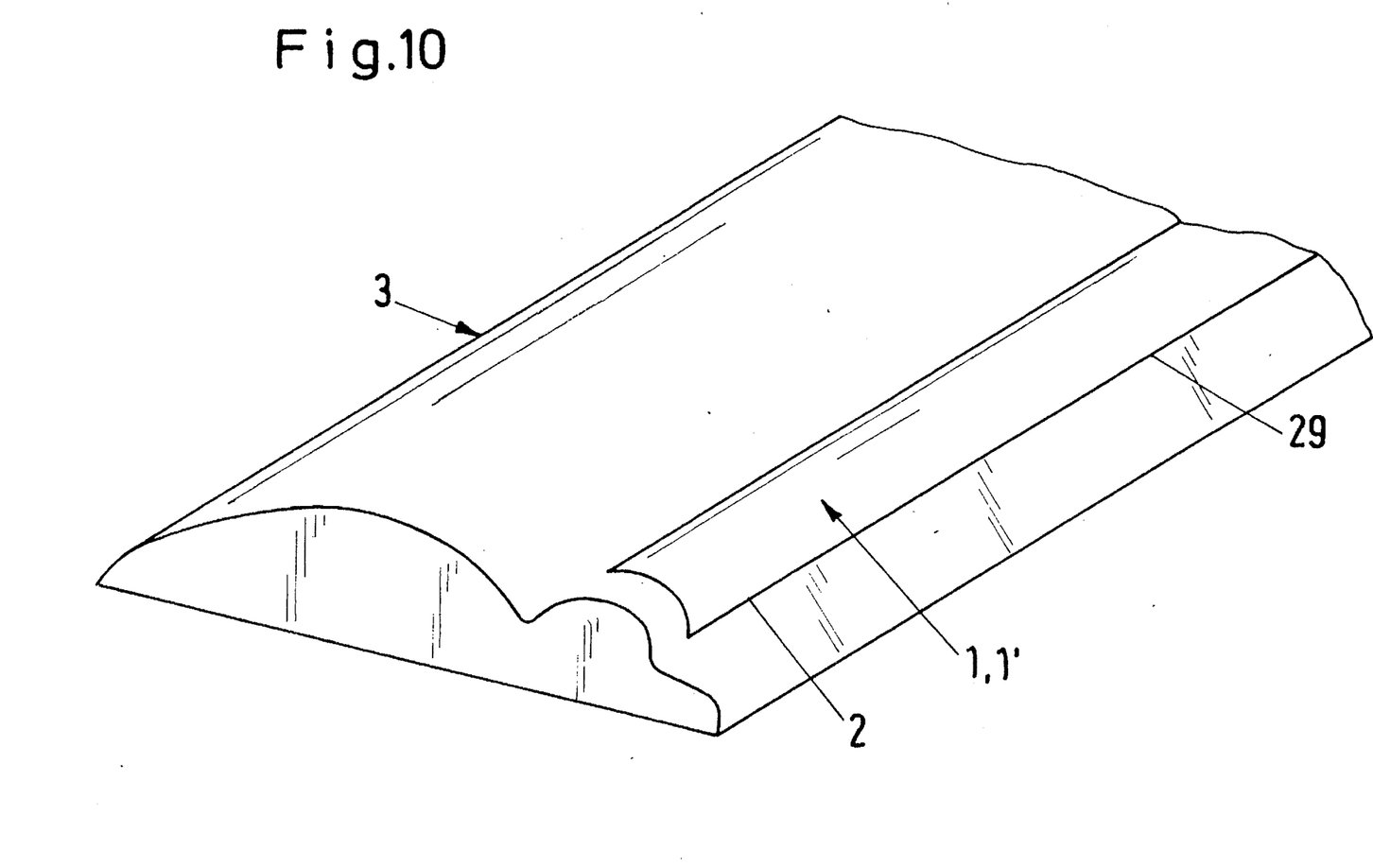
FIG. 10 is a broken off perspective view, for example, of a decorative molding made of synthetic material or containing synthetic material and provided with a decorative strip having a color different from the molding.

FIG. 10 shows an embodiment in which the lacquer or paint carrier 1, 1' is directly applied onto a beaded surface 2 of a component 3 that can be any type of component such as decorative or protective moldings and the like. It is necessary that the adhesive 10 on the back of the substrate of the carrier 1, 1' is compatible with the material of which the body of the article 3 is made. Further, the shape and configuration as well as the size of the carrier 1, 1' can be selected for any desired purpose. The configuration illustrated in the drawings, for example, in FIG. 10 are not to be taken as limiting the applications of the invention. Elongated strips in the form of carriers 1, 1' are, however, particularly suitable as decor strips 29 shown in FIG. 10, whereby the body of the article 3 is made of a synthetic material or any other material suitable for the intended purpose. In all instances the carrier of the invention is sufficiently flexible to easily conform to the contour of the article to be lacquered or painted or decorated.

Where the substrate that forms a flexible carrier for the paint or lacquer is a synthetic material film especially a polyester film, it is possible to apply at least one paint or lacquer ply to the synthetic material film and then deep drawing the painted or lacquered synthetic material film that forms the flexible carrier. The deep drawing is preferably performed in a mold and then a foam backing is applied to the deep-drawn carrier. The foam backing is applied for example by spraying the foam material onto the back side of the flexible, deep-drawn carrier. In another example for the application of the foam backing, the foam material is introduced into the deep-drawing mold, wherein a back-foaming is performed with the deep-drawn flexible carrier still in the mold. The resulting product has a reinforcing foam backing to which the carrier with its paint or lacquer is attached.

Although the invention has been described with reference to specific example embodiments, it will be appreciated that it is intended to cover all modifications and equivalents within the scope of the appended claims.

What is claimed is:

1. A method for painting or lacquering an article of manufacture, comprising the following steps:
   (a) preparing a polyester film as a flexible substrate to provide at least one prepared surface on said flexible substrate of polyester film for application of a paint or lacquer to said prepared surface;
   (b) biaxially stretching said polyester film prior to said application of said paint or lacquer to provide a biaxially stretched polyester film;
   (c) then applying at least one paint or lacquer to said prepared surface of said biaxially stretched polyester film to form a painted or lacquered flexible carrier to which said paint or lacquer is permanently attached, and
   (d) securing said painted or lacquered flexible carrier of polyester film to a surface of said article of manufacture, whereby said flexible carrier with its paint or lacquer remains attached to said article of manufacture.

2. The method of claim 1, wherein said preparing step comprises treating said at least one surface for acceptance of an adhesion enhancer, selecting said adhesion enhancer from the group of acrylic polymer on an acrylate basis, and then applying said adhesion enhancer to said at least one surface prior to said application of said paint or lacquer.

3. The method of claim 1, wherein said securing step is performed directly on said surface of said article of manufacture.

4. The method of claim 1, wherein said securing step comprises applying said flexible carrier to an intermediate article and then attaching said intermediate article to said article of manufacture.

5. The method of claim 4, wherein said intermediate article is produced as a metal carrier for said flexible lacquered or painted carrier.

6. The method of claim 4, further comprising making said article of manufacture of synthetic material, providing said article of manufacture with a recess and securing said intermediate article in said recess with said paint or lacquer visible.

7. The method of claim 4, further comprising making said article of manufacture of synthetic material, providing said article of manufacture with a cut-out, and securing said intermediate article in said cut-out with said paint or lacquer visible.

8. The method of claim 1, further comprising deep-drawing said painted or lacquered flexible carrier in a mold, and then applying a foam backing to the deep-drawn carrier.

9. The method of claim 8, wherein said applying of said foam backing is performed by spraying a foam material onto a backside of said flexible carrier.

10. The method of claim 8, wherein said applying of said foam backing is performed by back-foaming in said mold by introducing a foam material into said mold.

11. The method of claim 1, further comprising vapor depositing an aluminum coating on at least one surface of said polyester film.

12. The method of claim 1, wherein said biaxial stretching of said polyester film flexible substrate reduces said polyester film to a thickness within the range of 20 to 50 µm.

13. The method of claim 2, wherein said adhesion enhancer is applied to have a ply thickness within the range of 0.2 µm to 5.0 µm.

14. A method for painting or lacquering an article of manufacture, comprising the following steps:
   (a) preparing a polyester film as a flexible substrate to provide at least one prepared surface on said flexible substrate of polyester film for application of a paint or lacquer to said prepared surface;
   (b) biaxially stretching said polyester film prior to said application of said paint or lacquer to provide a biaxially stretched polyester film;
   (c) selecting said paint or lacquer from the group consisting of acrylic base lacquers containing hydroxyl groups, and adding to said base lacquer aliphatic polyisocyanate as a hardener, a modified polyester as an elastifier, an organo-tin as a catalyzer, and polysiloxane as an anti-blocking agent to provide a selected paint or lacquer;
   (d) then applying said selected paint or lacquer to said prepared surface of said biaxially stretched polyester film to form a painted or lacquered flexible carrier to which said selected paint or lacquer is permanently attached, and
   (e) securing said painted or lacquered flexible carrier of polyester film to a surface of said article of manufacture, whereby said flexible carrier with its paint or lacquer remains attached to said article of manufacture.

15. The method of claim 14, further comprising combining 60.7 wt. %, of said acrylic base lacquer, 29.6 wt. % of said aliphatic polyisocyanate hardener, 4.5 wt. % of said modified polyester elastifier, 4.7 wt. % of said organo-tin catalyzer, and 0.5 % wt. % of said polysiloxane anti-blocking agent to produce said paint or lacquer.

16. The method of claim 15, wherein said organo-tin catalyzer is dibutyl-tin dilaurate.

17. The method of claim 15, wherein said polysiloxane anti-blocking agent is a polysiloxane-polyetherpolymer.

18. A method for painting or lacquering an article of manufacture, comprising the following steps:
   (a) preparing a polyester film as a flexible substrate to provide at least one prepared surface on said flexible substrate of polyester film for application of a paint or lacquer to said prepared surface;
   (b) biaxially stretching said polyester film prior to said application of said paint or lacquer to provide a biaxially stretched polyester film;

(c) applying said at least one paint or lacquer as a modified two component polyurethane lacquer or a base lacquer with a metallic pigment, further applying an adhesive coating on another surface of said substrate, applying a protective cover on said adhesive coating, and applying a further paint or lacquer on said at least one paint or lacquer, and (d) securing said painted or lacquered flexible carrier of polyester film to a surface of said article of manufacture, whereby said flexible carrier with its paint or lacquer remains attached to said article of manufacture.

19. The method of claim 18, wherein said further paint or lacquer is selected as a two component clear lacquer.

20. The method of claim 18, wherein said protective cover is selected as a siliconized cover paper.

21. The method of claim 20, wherein said siliconized cover paper is selected to have a ply thickness within the range of 50 to 300 μm.

22. The method of claim 18, wherein said adhesive coating is selected as a heat curing acrylate contact adhesive or cement.

23. The method of claim 22, wherein said heat curing acrylate contact adhesive or cement is applied to have a layer thickness within the range of 5 to 15 μm.

24. The method of claim 1, wherein said preparing step comprises treating both surfaces of said polyester film flexible substrate for accepting an adhesion enhancer on one surface and an adhesive coating on the other surface of said polyester film flexible substrate.

25. The method of claim 1, wherein said paint or lacquer is selected from the group of interlinked isocyanates forming a polyacrylate containing said hydroxyl groups.

26. The method of claim 2, wherein said adhesion enhancer is selected from the group of elastic resins stable against migrations.

27. The method of claim 14, wherein said polysiloxane anti-blocking agent is a modified polysiloxane.

28. The method of claim 1, wherein said paint or lacquer is made elastoic by a modified polyester elastifier which is present in said paint or lacquer in an amount of 4.5% by weight.

29. A method for painting or lacquering an article of manufacture, comprising the following steps:

(a) preparing a polyester film as a flexible substrate to provide at least one prepared surface on said flexible substrate of polyester film for application of a paint or lacquer to said prepared surface;

(b) biaxially stretching said polyester film prior to said application of said paint or lacquer to provide a biaxially stretched polyester film;

(c) then applying at least one paint or lacquer comprising a binder vehicle of a polyester cellulose aceto butyrate to said prepared surface of said biaxially stretched polyester film to form a painted or lacquered flexible carrier to which said paint or lacquer is permanently attached, and (d) securing said painted or lacquered flexible carrier of polyester film to a surface of said article of manufacture.

* * * * *

UNITED STATES PATENT AND TRADEMARK OFFICE
CERTIFICATE OF CORRECTION

PATENT NO. : 5,538,576
DATED : July 23, 1996
INVENTOR(S) : Knop, et. al.

It is certified that error appears in the above-indentified patent and that said Letters Patent is hereby corrected as shown below:

Column 10, claim 28, line 2, replace "elastoic" by --elastic--.

Signed and Sealed this

Twenty-second Day of October, 1996

Attest:

BRUCE LEHMAN

*Attesting Officer*    *Commissioner of Patents and Trademarks*